(12) United States Patent
Refaeli et al.

(10) Patent No.: US 7,809,980 B2
(45) Date of Patent: Oct. 5, 2010

(54) ERROR DETECTOR IN A CACHE MEMORY USING CONFIGURABLE WAY REDUNDANCY

(76) Inventors: Jehoda Refaeli, 8709 Edmund Ct., Austin, TX (US) 78749; Florian Bogenberger, Suedmaehrenstrasse 40, Poing (DE) 85586; James B. Eifert, 800 Valley View Dr., Austin, TX (US) 78733

( * ) Notice: Subject to any disclaimer, the term of this patent is extended or adjusted under 35 U.S.C. 154(b) by 403 days.

(21) Appl. No.: 11/951,924

(22) Filed: Dec. 6, 2007

(65) Prior Publication Data
US 2009/0150720 A1      Jun. 11, 2009

(51) Int. Cl.
*G06F 11/00*        (2006.01)
(52) U.S. Cl. .......................... 714/6; 711/128
(58) Field of Classification Search ............ 714/6; 711/128
See application file for complete search history.

(56) References Cited

U.S. PATENT DOCUMENTS

| | | | |
|---|---|---|---|
| 4,965,717 A | 10/1990 | Cutts, Jr. et al. |
| 5,146,589 A | 9/1992 | Peet, Jr. et al. |
| 5,193,175 A | 3/1993 | Cutts, Jr. et al. |
| 5,276,823 A | 1/1994 | Cutts, Jr. et al. |
| 5,295,258 A | 3/1994 | Jewett et al. |
| 5,313,585 A | 5/1994 | Jeffries et al. |
| 5,313,626 A | 5/1994 | Jones et al. |
| 5,317,726 A | 5/1994 | Horst |
| 5,384,906 A | 1/1995 | Horst |
| 5,388,242 A | 2/1995 | Jewett |
| 5,473,761 A | 12/1995 | Parks et al. |
| 5,483,641 A | 1/1996 | Jones et al. |
| 5,506,977 A | 4/1996 | Jones |
| 5,530,960 A | 6/1996 | Parks et al. |
| 5,588,111 A | 12/1996 | Cutts, Jr. et al. |
| 5,619,723 A | 4/1997 | Jones et al. |

(Continued)

FOREIGN PATENT DOCUMENTS

EP      401994 A2      12/1990

OTHER PUBLICATIONS

Shirvani et al. "PADded Cache: A new Fault Tolerant Technique for Cache Memories" date unknown.*

(Continued)

*Primary Examiner*—Bryce P Bonzo
(74) *Attorney, Agent, or Firm*—Ranjeev Singh; Joanna G. Chiu

(57) ABSTRACT

A data processing system includes a processor having a multi-way cache which has a first and a second way. The second way is configurable to either be redundant to the first way or to operate as an associative way independent of the first way. The system may further include a memory, where the processor, in response to a read address missing in the cache, provides the read address to the memory. The second way may be dynamically configured to be redundant to the first way during operation of the processor in response to an error detection signal. In one aspect, when the second way is configured to be redundant, in response to the read address hitting in the cache, data addressed by an index portion of the read address is provided from both the first and second way and compared to each other to determine if a comparison error exists.

20 Claims, 4 Drawing Sheets

U.S. PATENT DOCUMENTS

| | | | |
|---|---|---|---|
| 5,666,482 A * | 9/1997 | McClure .................. 714/8 |
| 5,758,113 A | 5/1998 | Peet, Jr. et al. |
| 5,890,003 A | 3/1999 | Cutts, Jr. et al. |
| 5,974,544 A | 10/1999 | Jeffries et al. |
| 6,073,251 A | 6/2000 | Jewett et al. |
| 6,145,055 A * | 11/2000 | Fujimoto .................. 711/128 |
| 6,263,452 B1 | 7/2001 | Jewett et al. |
| 6,480,975 B1 | 11/2002 | Arimilli et al. |
| 6,609,164 B1 | 8/2003 | Kallat |
| 6,615,366 B1 | 9/2003 | Grochowski et al. |
| 6,625,749 B1 | 9/2003 | Quach |
| 6,625,756 B1 | 9/2003 | Grochowski et al. |
| 6,631,433 B1 | 10/2003 | Paluzzi |
| 6,668,308 B2 | 12/2003 | Barroso et al. |
| 6,671,822 B1 * | 12/2003 | Asher et al. .................. 714/8 |
| 6,684,268 B1 | 1/2004 | Paluzzi |
| 6,708,294 B1 * | 3/2004 | Nakao et al. .................. 714/42 |
| 6,732,250 B2 | 5/2004 | Durrant |
| 6,898,738 B2 * | 5/2005 | Ryan et al. .................. 714/42 |
| 6,901,468 B1 | 5/2005 | Paluzzi |
| 6,988,170 B2 | 1/2006 | Barroso et al. |
| 7,010,575 B1 | 3/2006 | MacArthur et al. |
| 7,121,639 B2 | 10/2006 | Plunkett |
| 7,134,047 B2 | 11/2006 | Quach |
| 7,152,942 B2 | 12/2006 | Walmsley et al. |
| 7,165,824 B2 | 1/2007 | Walmsley et al. |
| 7,181,572 B2 | 2/2007 | Walmsley |
| 7,181,578 B1 | 2/2007 | Guha et al. |
| 7,188,282 B2 | 3/2007 | Walmsley |
| 2004/0078702 A1 | 4/2004 | Yoshizawa et al. |
| 2007/0136530 A1 | 6/2007 | Tanaka |
| 2008/0140962 A1 | 6/2008 | Pattabiraman et al. |

OTHER PUBLICATIONS

Lee et al. "Performance of Graceful Degradation for Cache Faults" May 9-11, 2007.*

PCT Appl. No. PCT/US2008/084261 Search Report and Written Opinion mailed Jun. 29, 2009.

Kim, Seongwoo et al.; "Area Efficient Architectures for Information Integrity in Cache Memories"; Proceedings of the 26th Annual International Symposium of Computer Architecture;1999; 10 pp; IEEE Computer Society.

Zhang, Wei et al.;" ICR: In-Cache Replication for Enhancing Data Cache Reliability"; Proceedings of the 2003 International Conference on Dependable Systems and Networks, 2003, 10 pp; IEEE Computer Society.

* cited by examiner

| | UCW0 | UCW1 | ... | CORR_E | PE0 | PE1 | ... | CW0 |
|---|---|---|---|---|---|---|---|---|
| 1 | 0 | 0 | | 1 | X | X | | 0 |
| 2 | 1 | X | | 1 | 0 | X | | 1 |
| 3 | 0 | 1 | | 1 | X | 0 | | 1 |
| 4 | 0 | 1 | | 1 | X | 1 | | 0 |
| 5 | 1 | 0 | | 1 | 1 | X | | 0 |
| 6 | 1 | 1 | | 1 | 1 | 0 | | 1 |
| 7 | 1 | 1 | | 1 | 1 | 1 | | 0 |
| 8 | 1 | X | | 0 | X | X | | 1 |
| 9 | X | 1 | | 0 | X | X | | 1 |

ERROR DETECTOR IN A CACHE MEMORY USING CONFIGURABLE WAY REDUNDANCY

BACKGROUND

1. Field

This disclosure relates generally to memories, and more specifically, to a system for error detection and/or correction for memories.

2. Related Art

Traditional cache memories can typically detect only a single fault per byte, assuming they have byte parity. In such cache memories, if two bits change their value in a single byte, then no fault may be detected. In systems where higher levels of fault tolerance is necessary, the hamming distance of the code used to correct errors may need to be increased to four. The increased hamming distance, however, makes such cache memory systems complicated. In addition, complicated error correction and detection may also lower the performance of the cache memory.

Certain users of cache memories may want to incur the penalty associated with lower performance as long as they have a more robust cache memory. Other users of cache memories, however, may not care about the robustness of the cache memory and may not like the lower performance associated with the cache memory. Accordingly, there is a need for a configurable cache memory that can satisfy both types of users while maintaining a high level of performance and robustness.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
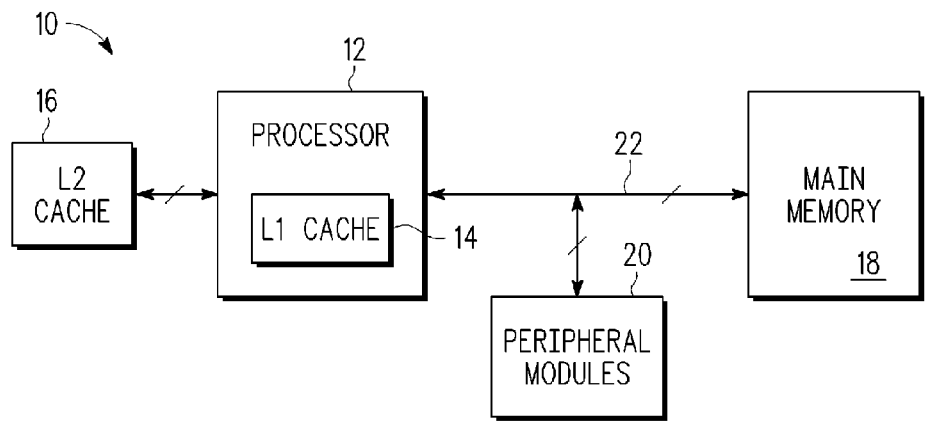
FIG. 1 shows a data processing system environment associated with a cache memory.

In one aspect, a data processing system including a processor having a multi-way cache which has a first way and a second way, wherein the second way is configurable to either be redundant to the first way or to operate as an associative way of the multi-way cache independent of the first way. The data processing system further includes a memory coupled to the processor, wherein the processor, in response to a read address missing in the multi-way cache, provides the read address to the memory.

In another aspect, a data processing system including a processor is provided. The processor has a multi-way cache which has a first way and a second way and is configurable to operate in a first mode or in a second mode, wherein, in the first mode of operation, the first way and the second way each operate as an associative way of the multi-way cache, independent of each other, and, in the second mode of operation, the second way is redundant to the first way such that, in response to a read address hitting in the multi-way cache, data addressed by an index portion of the read address is provided from both the first way and the second way and compared to each other to provide a comparison error signal in response thereto indicating whether or not a comparison error exists, and wherein the processor, in response to the read address missing in the multi-way cache, provides the read address to a memory external to the processor.

In yet another aspect, a data processing system including a processor is provided. The processor has an n-way associative cache configurable to operate in a first mode or a second mode, wherein in the first mode of operation, each way of the n-way associative cache operates as an independent way of the n-way associative cache, and in the second mode of operation, the n-way associative cache operates as an n/2-way cache, wherein for each of the n/2 ways, another way of the n-ways operates as a corresponding redundant way As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 shows a data processing system 10 associated with a cache memory. Data processing system 10 may include a processor 12 having a level one (L1) cache memory 12, a level two (L2) cache memory 14, a main memory 18, and peripheral modules 20. Processor 12 may be coupled to main memory 18 and peripheral modules 20 via system bus 22. L2 cache memory 16 may be coupled to processor 12 via system bus 22 or a different bus. Although L1 cache memory 14 is shown as part of processor 12, L1 cache memory 14 may be coupled via system bus 22 to processor 12. L1 cache memory 14 and L2 cache memory 16 may be set multi-way associative cache memories or any other suitable cache memories. Although FIG. 1 shows a particular number of components and a particular arrangement of these components, there may be more or fewer components and they may be arranged differently.

Figure 2:
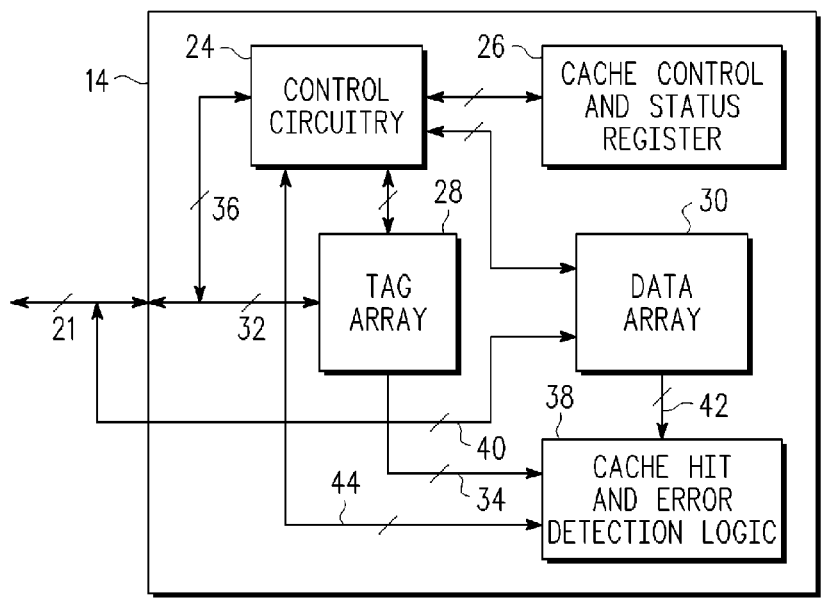
FIG. 2 shows an exemplary cache memory.

FIG. 2 shows an exemplary L1 cache memory 14. L1 cache memory may include control circuitry 24, cache control and status register (CCSR) 26, tag array 28, data array 30, and cache hit and error detection logic 38. L1 cache memory 14 may receive, via bus 21, which may be internal to processor 12, address and/or data corresponding to a read/write operation to main memory 18. In one embodiment, addresses, such as tag addresses may be communicated with tag array 28 via address bus 32. In one embodiment, data may be communicated with data array 30 via data bus 34. Control circuitry 24 may also receive tag address and data information via bus 36. Cache hit and error detection logic 38 may communicate with control circuitry via bus 44. Cache hit and error detection logic 38 may communicate with tag array 28 via bus 40 and with data array 30 via bus 42. Control circuitry 24 may also be coupled to CCSR 26, such that control circuitry 24 may read status information from CCSR 26 and write control information to CCSR 26. Although FIG. 2 shows a particular number of components and a particular arrangement of these components, there may be more or fewer components and they may be arranged differently.

Figure 3:
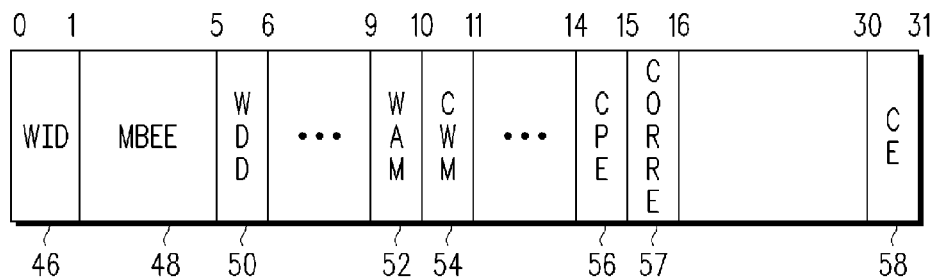
FIG. 3 shows an exemplary cache control and status register associated with the exemplary cache memory of FIG. 2.

FIG. 3 shows an exemplary cache control and status register (CCSR) 26 associated with the exemplary cache memory of FIG. 2. CCSR 26 may include several fields for various control and status information related to L1 cache memory 14. By way of example, CCSR 26 may include bits related to various control and status information, such as WID bits 46, MBEE bits 48, WDD bits 50, WAM bit 52, CWM bit 54, CPE bit 56, CORRE bit 57, and CE bit 58. WID bits 46 may relate to the replacement policy of L1 cache memory 14. One of WID bits 46 may relate to way 0 and that other may relate to way 1. If WID bit is 1 then the corresponding way is not available for replacement by instruction miss line fills, but on the other hand if WID bit is 0 then the corresponding way is available for replacement by instruction miss line fills. MBEE bits 48 may relate to whether multi-bit error detection and/or error correction is enabled. The use of MBEE bits 48 is further explained with respect to later figures. WDD bits 50 may relate to data replacement policy of L1 cache memory 14. One of WDD bits 50 may relate to way 0 and that other may relate to way 1. If WDD bit is 0 then the corresponding way is not available for replacement by data miss line fills, but on the other hand if WDD bit is 1 then the corresponding way is available for replacement by data miss line fills. WAM bit 52 may relate to whether ways are enabled for replacement on a particular access type. By way of example, if WAM bit 52 is 0, then ways not enabled for replacement on a particular access type (instruction versus data) are still checked for a cache hit for accesses of that type but are not replaced by an access miss of that type. On the other hand, if WAM bit 52 is 1 then ways not enabled for replacement on a particular access type are not checked. This results in lower power consumption. CWM bit 54 relates to cache write mode, i.e., whether the cache memory is operating in writethrough mode or copyback mode. CPE bit 56 relates to whether cache memory parity checking is enabled or not. CORRE bit 57 relates to whether error correction is enabled or not. CE bit 58 relates to whether cache memory is enabled or not. Although FIG. 3 shows a specific number and types of bits as part of CCSR 26, CCSR 26 may include additional or fewer number and different types of bits.

Figure 4:
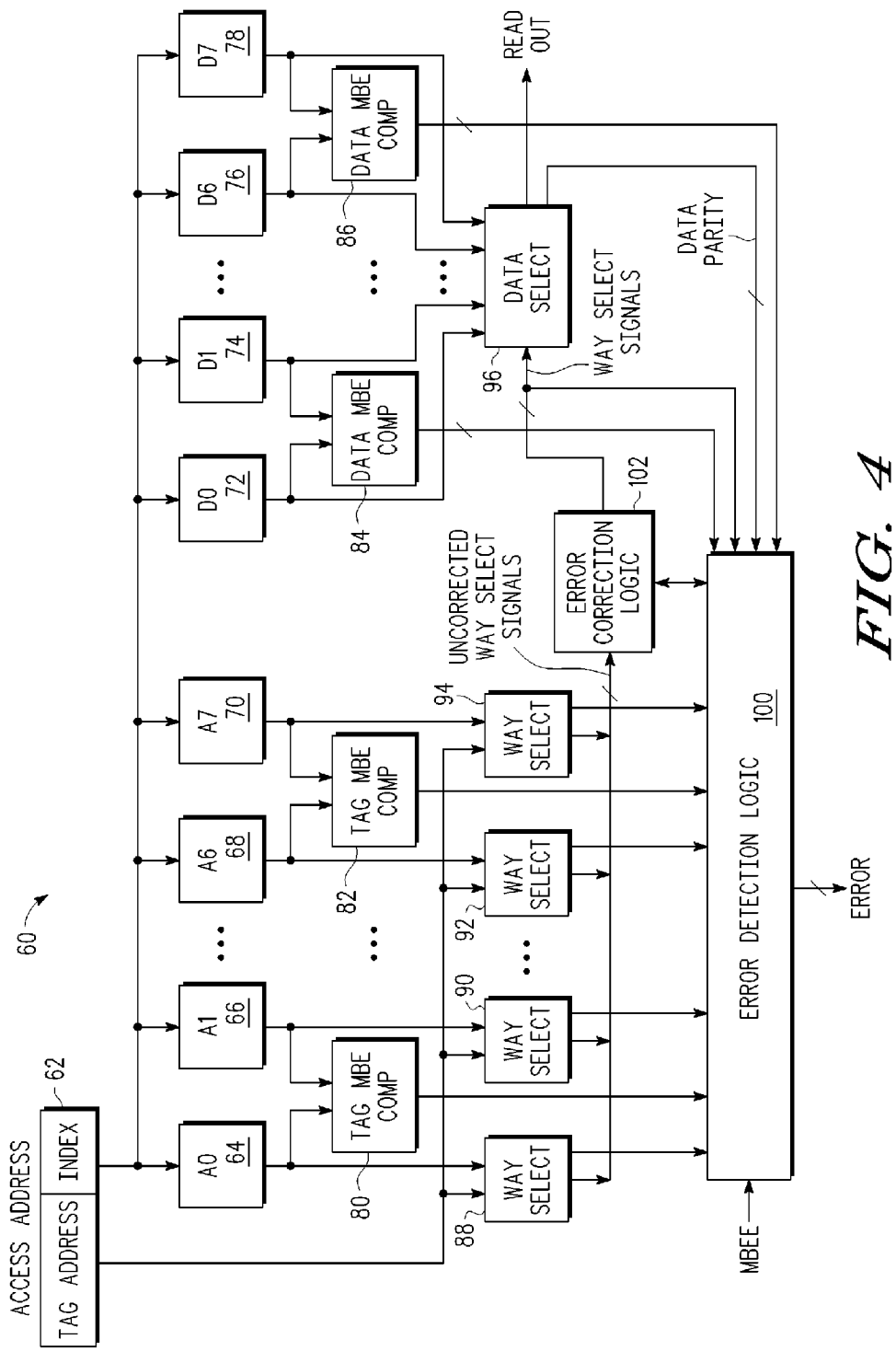
FIG. 4 shows an exemplary portion of the exemplary cache memory of FIG. 2.

FIG. 4 shows an exemplary portion 60 of L1 cache memory 14 of FIG. 2. As explained earlier with respect to FIG. 2, L1 cache memory 14 may include tag array 28 and data array 30. Tag array 28 may include arrays of tag addresses, including A0 64, A1 66, A6 68, and A7 70. Although FIG. 4 shows only eight arrays of tag addresses, tag array 28 may include additional or fewer arrays. Data array 30 portion of L1 cache memory 14 may include arrays of data, including D0 72, D1 74, D6 76, and D7 78. Although FIG. 4 shows only eight arrays of data, data array 30 may include additional or fewer arrays. In one embodiment, L1 cache memory 14 may be a two-way set associative cache memory, such that the first way may correspond to tag arrays A0, A2, A4, and A6 and the second way may correspond to tag arrays A1, A3, A5, and A7. The tag arrays corresponding to the second way, however, could operate either as redundant tag arrays for the first way or as an associative way of the tag arrays corresponding to the first way. In other words, in one embodiment, the second way is configurable to either be redundant to the first way or to operate as an associative way of the multi-way cache independent of the first way. The second way may be dynamically configured to be redundant to the first way even during operation of the processor in response to detection of an error, for example. Thus, for example, tag array A1 66 may be a redundant tag array for tag array A0 64. In addition, when the second way is configured to be redundant to the first way, in response to the read address hitting in L1 cache memory 14, data addressed by an index portion of the address (for example, index portion of access address 62) is provided from both the first way and the second way and compared to each other to determine if a comparison error exists. By way of example, data from both tag array A0 64 and tag array A1 66 may be compared using TAG MBE COMP 80. Similarly, data from tag array A6 68 and tag array 70 may be compared using TAG MBE COMP 82.

Referring still to FIG. 4, the data arrays corresponding to the second way can also operate either as redundant data arrays for the first way or as an associative way of the data arrays corresponding to the first way. The second way may be dynamically configured to be redundant to the first way even during operation of the processor in response to detection of an error, for example. Thus, for example, data array D1 74 may be a redundant data array for data array D0 72. In addition, when the second way is configured to be redundant to the first way, in response to the read address hitting in L1 cache memory 14, data addressed by an index portion of the address (for example, index portion of access address 62) is provided from both the first way and the second way and compared to each other to determine if a comparison error exists. Thus, for example, data from data array D0 72 and data array 74 may be compared using DATA MBE COMP 84. In a similar fashion, data from data array 76 and data array 78 may be compared using DATA MBE COMP 86. Error detection logic 100 will indicate an error if a comparison on a bit by bit basis indicates that the values from any of these paired arrays are different from each other. In one embodiment, error detection logic 100 may generate the error only when MBEE signal, i.e., the multi-bit error enable signal is asserted. The MBBE signal may be asserted by processor 12 during operation and thus the processor can change the configuration of error detection logic 100 on the fly. Although FIG. 4 shows an 8-way cache that can be configured as a 4-way cache during the redundant mode, any number of ways could be used. In addition, although FIG. 4 shows a specific number of components arranged in a specific manner, fewer or additional components that may be arranged differently could be used, as well.

With continued reference to FIG. 4, way select 88, way select 90, way select 92, and way select 94 may calculate a parity using the data read from tag arrays (A0, A1, A6, and A7, for example). The calculated parity is compared with a stored parity corresponding to the read tag address to see whether a parity error exists. The output of way select blocks is coupled to error detection logic, such that the error detection logic can further process any parity errors generated by way select blocks. Data select 96 also performs a parity calculation on data read from data arrays (D0, D1, D6, and D7, for example). The generated parity bits are communicated via DATA PARITY bus to error detection logic 100. In sum, when the second way is configured to be redundant to the first way, a parity calculation is performed on the data addressed by the index portion of the read address from each of the first way and the second way and compared to a corresponding parity bit stored within the data addressed by the index portion of the read address to determine if a parity error exists.

Figures 5, 6:
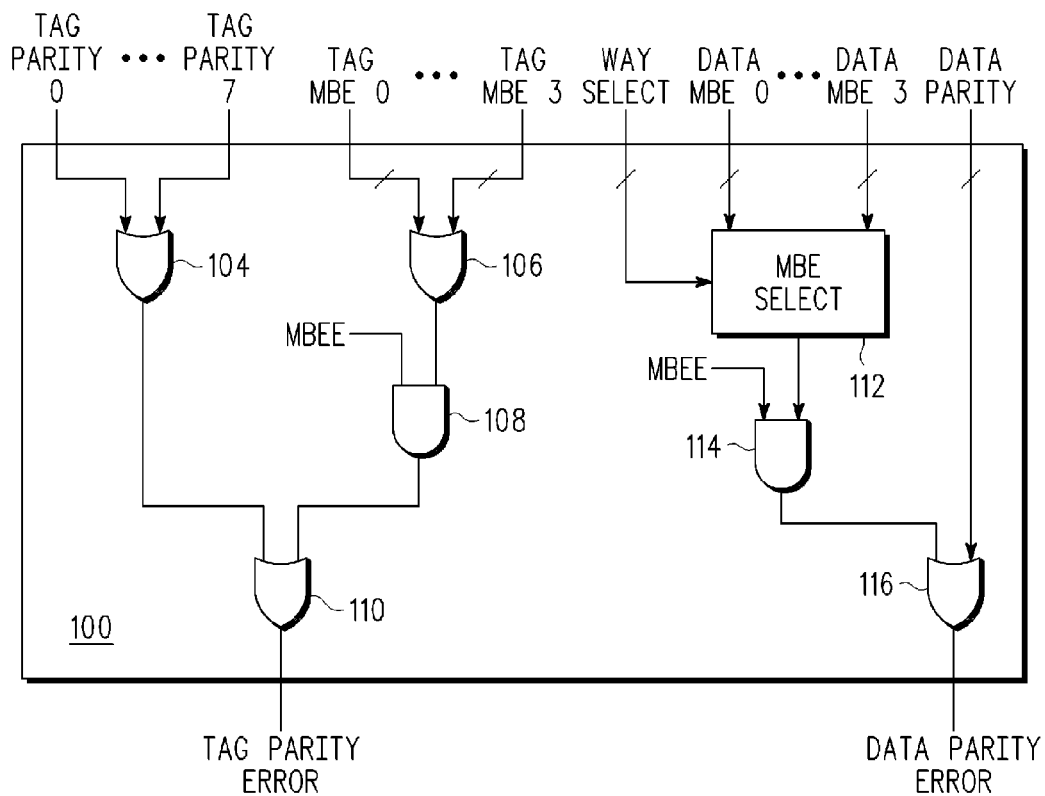
FIG. 5 shows an exemplary error detection logic associated with the cache memory of FIG. 2.
FIG. 6 shows an exemplary truth table for implementing error detection and correction associated with the exemplary cache memory of FIG. 2.

FIG. 5 shows an exemplary error detection logic 100 associated with the cache memory of FIG. 2. By way of example, error detection logic 100 may detect tag parity errors, multi-bit errors, and data parity errors. In one embodiment, error detection logic 100 may include OR gates 104, 106, 110, and 116. Error detection logic 100 may further include AND gates 108 and 114. Error detection logic 100 may further include an MBE SELECT block 112. Any tag parity errors generated by way select modules (88, 90, 92, 94, for example) may be coupled via TAG PARITY 0 . . . 7 lines to inputs of OR gate 104. By way of example, a tag parity error may be indicated by logic 1 asserted on the respective TAG PARITY line. In operation, if logic 1 is asserted on any of the TAG PARITY lines, then the output of OR gate 104 would be logic 1. Any multi-bit errors generated by TAG MBE COMP modules (80 and 82, for example) may be coupled via TAG MBE0 . . . 3 lines to inputs of OR gate 106. The output of OR gate 106 may be coupled to an input of AND gate 108. The MBEE signal may be coupled to the other input of AND gate 108. By way of example, a multi-bit error may be indicated by logic 1 asserted on the respective TAG MBE line. In operation, if logic 1 is asserted on any of the TAG MBE lines, then the output of OR gate 106 would be logic 1. Thus, when the output of OR gate 106 is logic 1 and the MBEE signal is also logic 1, then the output of AND gate 108 is logic 1. The output of OR gate 104 may be coupled to an input of OR gate 110 and the output of AND gate 108 may be coupled to the other input of OR gate 110. In this manner, logic 1 is asserted on the TAG PARITY ERROR line if either the output of OR gate 104 or the output of AND gate 108 is logic 1. In sum, in one embodiment, error detection logic 100 may assert logic 1 on the TAG PARITY ERROR line: (1) when there is a tag parity error, (2) when there is a multi-bit error, or (3) when there is both a tag parity error and a multi-bit error. Although FIG. 5 shows a specific number of components arranged in a specific manner to assert logic 1 on the TAG PARITY ERROR line, fewer or additional components that may be arranged differently could be used, as well.

Referring still to FIG. 5, error detection logic 100 may also generate a data parity error on the DATA PARITY ERROR line. By way of example, multi-bit errors generated by DATA MBE COMP blocks (84 and 86, for example) may be coupled via DATA MBE 0 . . . 3 lines to MBE SELECT 112. Based on an input received via WAY SELECT line, MBE SELECT 112 may select one of four inputs and couple that to its output. In one embodiment, MBE SELECT 112 may be implemented as a four-to-one selection multiplexer. The output of MBE SELECT 112 may be coupled to an input of AND gate 112. The MBEE signal may be coupled to the other input of AND gate 114. By way of example, a multi-bit error may be indicated by logic 1 asserted on the respective DATA MBE line. In operation, if logic 1 is asserted on any of the selected DATA MBE line, then the output of MBE SELECT 112 would be logic 1. Thus, when the output of MBE SELECT 112 is logic 1, indicating a multi-bit error corresponding to the selected data, and the MBEE signal is also logic 1, then the output of AND gate 114 is logic 1. The output of AND gate 114 may be coupled to an input of OR gate 116 and a DATA PARITY line may be coupled to the other input of OR gate 116. In this manner, when the output of AND gate 114 is logic 1 or if there is a data parity error, then the output of OR gate 116 would be logic 1. This would result in the assertion of logic 1 on the DATA PARITY ERROR line. Although FIG. 5 shows a specific number of components arranged in a specific manner to assert logic 1 on the DATA PARITY ERROR line, fewer or additional components that may be arranged differently could be used, as well. Any errors detected as part of error detection logic 100 may be communicated to external components via ERROR line.

FIG. 6 shows an exemplary truth table 120 for implementing error correction associated with the exemplary cache memory of FIG. 2. Truth table 120 includes a set of columns, which correspond to a set of variables that can have logic 1 value or logic 0 value. The rows in truth table 120 include exemplary values of interest for the set of columns in truth table 120. Column 122 has values for variable UCW0 that relates to uncorrected way 0. Column 124 has values for variable UCW1 that relates to uncorrected way 1. Column 126 has values for CORR_E variable that relates to whether error correction is enabled or not. Column 128 has values for variable PE0 that relates to whether there is parity error for data corresponding to way 0. Column 130 has values for variable PE1 that relates to whether there is a parity error for data corresponding to way 1. Column 132 has values for variable CW0 that relates to whether a corrected way is selected or not. Truth Table 120 merely shows exemplary values for some of the variables, values for other variables, such as UCW2 . . . 7 may also be stored in this table or another table. In operation, the function of truth table 120 may be implemented by logic modules, software, and/or software hardware combination. In operation, if error correction mode is enabled by setting the value of the variable CORR_E 126 to a logic 1, the correct way match signal will be selected from a pair of uncorrected way match signals based on the parity check error of the uncorrected tag way bits. If UCW0 is logic 0, then that would indicate that the uncorrected way 0 is not the selected way. If UCW1 is logic 0, then that would indicate that the uncorrected way 1 is not the selected way. In that case, regardless of the values of the variables PE0 and PE1, the corrected way 0 will not be selected. Truth table 120 indicates this by having an X (don't care) corresponding to the variables PE0 and PE1 and a logic 0 value for the variable CW0, when UCW0 and UCW1 are both logic 0. Assuming one of the ways out of way 0 and way 1 is selected, then based on the values of the variables PE0 and PE1, the correct way will be selected. By way of example, the second row of truth table 120 shows a case where UCW0 is logic 1 indicating that uncorrected way 0 is the selected way. In this case, UCW1 is don't care and CORR_E is set to logic 1 indicating that correction is enabled. PE0 is 0 indicating there is no parity error for way 0. Accordingly, CW0 has logic 1, indicating that corrected way 0 is selected. The remaining rows of table 120 show additional cases with different values for the variables and corresponding values for the corrected way 0. A person of ordinary skill in the art can implement truth table 120 using values other than shown in FIG. 6. Although FIG. 6 shows a specific number of columns of variables and a specific number of rows arranged in a specific manner, fewer and/or additional columns and/or rows arranged differently may also be used.

Figure 7:
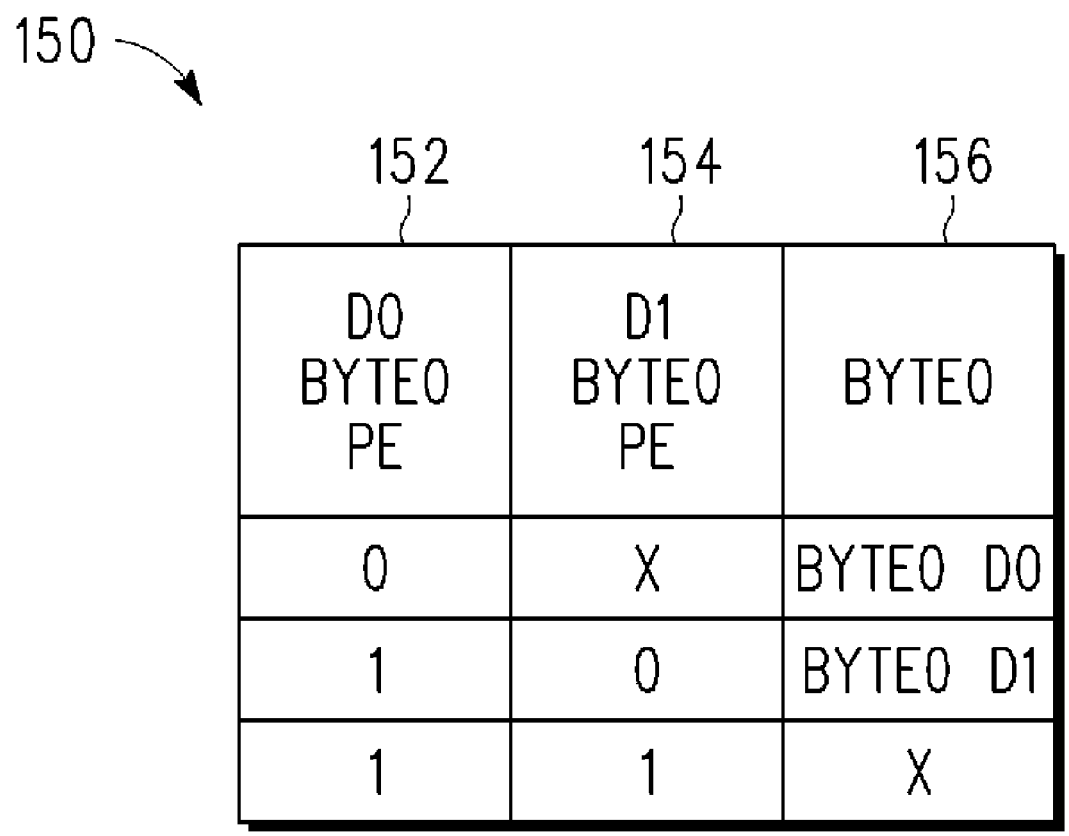
FIG. 7 shows an exemplary truth table for implementing error correction associated with the exemplary cache memory of FIG. 2.

FIG. 7 shows another exemplary truth table for implementing error correction associated with the exemplary cache memory of FIG. 2. In one embodiment, the functionality of truth table 150 may be implemented as part of DATA SELECT 96, shown in FIG. 4. DATA SELECT 96 may select one byte of each way of data from a pair of two ways of data based on the byte parity error information of the two ways. For example, byte0 from D0 and D1 is selected based on the byte0 parity error information in D0 and D1, as shown in FIG. 4. FIG. 7 illustrates one embodiment that shows only D0, D1 and byte 0 for purposes of simplicity and clarity. Data selection from other way pairs and other byte numbers works with a similar scheme. Truth table 150 includes a set of columns, which correspond to a set of variables that can have logic 1 value or a logic 0 value. The rows in truth table 150 include exemplary values of interest for the set of columns in truth table 150. Column 152 has values corresponding to variable D0 BYTE0 PE, which indicates the logic state of the parity error for D0 BYTE0—a 0 means no parity error and a 1 means a parity error. Column 154 has values corresponding to variable D1 BYTE0 PE, which indicates the logic state of the parity error for D1 BYTE0—a 0 means no parity error, a 1 means a parity error, and an "X" means a don't care. If D0 BYTE0 PE is a 0, byte 0 is selected regardless the state of D1 BYTE0 PE. This is shown in row 1 of the table. The second case is if D0 BYTE0 PE is a 1, indicating a parity error, but the D1 BYTE0 PE is a 0, then byte 0 from D1 will be selected. In this case, D1 data is used to replace D0 data. The last case is if both D0 BYTE0 PE and D1 BYTE0 PE are a 1, indicating that the bytes in both way paired data blocks have errors. In this case, the data byte will not be used and an error flag will be set. This case is indicated in the last row of the table as an "X". A person of ordinary skill in the art can implement truth table 150 using values other than shown in FIG. 7. Although FIG. 7 shows a specific number of columns of variables and a specific number of rows arranged in a specific manner, fewer and/or additional columns and/or rows arranged differently may also be used.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 18 may be located on a same integrated circuit as processor 12 or on a separate integrated circuit or located within another peripheral or slave discretely separate from other elements of system 10. Peripheral modules 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A data processing system comprising:
   a processor having a multi-way cache which has a first way and a second way, wherein the second way is configurable to either be redundant to the first way or to operate as an associative way of the multi-way cache independent of the first way; and
   a memory coupled to the processor, wherein the processor, in response to a read address missing in the multi-way cache, provides the read address to the memory.

2. The data processing system of claim 1, wherein second way is dynamically configured to be redundant to the first way during operation of the processor in response to an error detection indicator.

3. The data processing system of claim 1, wherein when the second way is configured to be redundant to the first way, in response to the read address hitting in the multi-way cache, data addressed by an index portion of the read address is provided from both the first way and the second way and compared to each other to determine if a comparison error exists.

4. The data processing system of claim 3, wherein when the second way is configured to be redundant to the first way, a parity calculation is performed on the data addressed by the index portion of the read address from each of the first way and the second way and compared to a corresponding parity bit stored within the data addressed by the index portion of the read address to determine if a parity error exists.

5. The data processing system of claim 3, wherein the first way includes a first tag array and a first data array and the second way includes a second tag array and a second data array, wherein when the second way is configured to be redundant to the first way, the second tag array is redundant to the first tag array and the second data array is redundant to the first data array, wherein in response to the read address hitting in the multi-way cache, the data addressed by the index portion of the read address includes tag information addressed by the index portion from both the first tag array and second tag array which are compared to each other and includes data information addressed by the index portion from both the first data array and second data array which are compared to each other.

6. A data processing system comprising:
a processor having a multi-way cache which has a first way and a second way and is configurable to operate in a first mode or in a second mode, wherein, in the first mode of operation, the first way and the second way each operate as an associative way of the multi-way cache, independent of each other, and, in the second mode of operation, the second way is redundant to the first way such that, in response to a read address hitting in the multi-way cache, data addressed by an index portion of the read address is provided from both the first way and the second way and compared to each other to provide a comparison error signal in response thereto indicating whether or not a comparison error exists, and wherein the processor, in response to the read address missing in the multi-way cache, provides the read address to a memory external to the processor.

7. The data processing system of claim 6, wherein the multi-way cache includes a cache control register, wherein the multi-way cache is configurable to operate in the first mode or in the second mode based on an error detection enable field of the cache control register.

8. The data processing system of claim 6, wherein the data addressed by the index portion of the read address from each of the first way and the second way includes a parity bit.

9. The data processing system of claim 8, wherein, in the second mode of operation, a parity calculation is performed on the data addressed by the index portion of the read address from each of the first way and the second way and compared to its corresponding parity bit to provide a parity error signal in response thereto indicating whether or not a parity error exists.

10. The data processing system of claim 9, wherein, in the second mode of operation, the multi-way cache provides an error signal based on the comparison error signal and the parity error signal.

11. The data processing system of claim 6, wherein the first way of the multi-way cache includes a first tag array and the second way of the multi-way cache includes a second tag array, wherein, in the second mode of operation, the second tag array is redundant to the first tag array such that a tag addressed by the index portion is provided from both the first tag array and second tag array and compared to each other to provide the comparison error signal.

12. The data processing system of claim 6, wherein the first way of the multi-way cache includes a first data array and the second way of the multi-way cache includes a second data array, wherein, in the second mode of operation, the second data array is redundant to the first data array such that the data addressed by the index portion is provided from the first data array and second data array and compared to each other to provide the comparison error signal.

13. The data processing system of claim 12, wherein, in the second mode of operation, the data addressed by the index portion that is provided from the first data array and the second data array includes a plurality of bytes, and wherein the comparison error signal is a multiple bit signal indicating whether a comparison error exists for each byte of the plurality of bytes.

14. The data processing system of claim 6, further comprising the memory external to the processor.

15. The data processing system of claim 6, wherein the multi-way cache further comprises error correction logic which selectively corrects, based at least in part on the comparison error signal, an error in the data addressed by the index portion of the read address.

16. A data processing system comprising:
a processor having an n-way associative cache configurable to operate in a first mode or a second mode, wherein in the first mode of operation, each way of the n-way associative cache operates as an independent way of the n-way associative cache, and in the second mode of operation, the n-way associative cache operates as an n/2-way cache, wherein for each of the n/2 ways, another way of the n-ways operates as a corresponding redundant way.

17. The data processing system of claim 16, wherein, in the second mode of operation, in response to a read address hitting in the multi-way cache, data addressed by an index portion of the read address is provided from each of the n/2 ways and its corresponding redundant way and compared to each other to determine if any comparison errors exist.

18. The data processing system of claim 17, wherein, in the second mode of operation, a parity calculation is performed on the data addressed by the index portion of the read address from each of the n/2 ways and the corresponding redundant ways to determine if any parity errors exist.

19. The data processing system of claim 16, wherein n is an integer greater than or equal to 2, and wherein, in the second mode of operation, when n is 2, the n-way associative cache operates a direct mapped cache and when n is greater than 2, the n-way associative cache operates as a set associative cache.

20. The data processing system of claim 16, wherein the multi-way cache is dynamically configurable during operation of the processor to operate in the first mode or the second mode in response to a programmable error detection indicator.

* * * * *